US010752531B2

(12) United States Patent
Ingerle

(10) Patent No.: US 10,752,531 B2
(45) Date of Patent: Aug. 25, 2020

(54) METHOD FOR BIOLOGICAL WASTEWATER PURIFICATION WITH PHOSPHOROUS REMOVAL

(71) Applicant: Kurt Ingerle, Goetzens (AT)

(72) Inventor: Kurt Ingerle, Goetzens (AT)

( * ) Notice: Subject to any disclaimer, the term of this patent is extended or adjusted under 35 U.S.C. 154(b) by 0 days.

(21) Appl. No.: 15/556,336

(22) PCT Filed: Feb. 24, 2016

(86) PCT No.: PCT/AT2016/050039
§ 371 (c)(1),
(2) Date: Sep. 7, 2017

(87) PCT Pub. No.: WO2016/154646
PCT Pub. Date: Oct. 6, 2016

(65) Prior Publication Data
US 2018/0099886 A1 Apr. 12, 2018

(30) Foreign Application Priority Data
Apr. 2, 2015 (AT) .............................. A 50261 2015

(51) Int. Cl.
*C02F 3/22* (2006.01)
*C02F 3/12* (2006.01)
(Continued)

(52) U.S. Cl.
CPC ............. *C02F 3/223* (2013.01); *C02F 3/121* (2013.01); *C02F 3/1263* (2013.01); *C02F 3/308* (2013.01);
(Continued)

(58) Field of Classification Search
CPC ........ C02F 3/1263; C02F 3/223; C02F 3/121; C02F 3/12; C02F 11/12; C02F 3/30; C02F 3/302; C02F 3/308
(Continued)

(56) References Cited

U.S. PATENT DOCUMENTS

| 5,902,484 A | * | 5/1999 | Timpany ................. C02F 3/006 210/621 |
| 2003/0164331 A1 | * | 9/2003 | Ingerle .................... C02F 3/121 210/626 |

(Continued)

*Primary Examiner* — Claire A Norris
(74) *Attorney, Agent, or Firm* — Eversheds Sutherland (US) LLP

(57) ABSTRACT

The invention relates to a method for carrying out biological purification of wastewater with the aid of activated sludge, in which the wastewater is introduced into an activated sludge tank (B tank) and then, in alternation, into one of a number of sedimentation and recirculation tanks (SU tanks) continuously connected hydraulically to the B tank and in which a number of operating cycles are carried out, including a sludge return phase, a mixing phase, a sedimentation phase and a draw-off phase (S phase, U phase, V phase, and A phase respectively), wherein the method further includes elimination of phosphor by using a tank for biological phosphor elimination (P tank), wherein the P tank is hydraulically connected with the B tank via one or more openings, wherein the wastewater is first introduced into the P tank and then subsequently transferred into the B tank, wherein in the S phase at least part of the thickened activated sludge is introduced from the SU tank into the P tank, and, wherein the volume of the P tank is mixed permanently or intermittently.

5 Claims, 2 Drawing Sheets

(51) Int. Cl.
  *C02F 3/30* (2006.01)
  *C02F 101/10* (2006.01)
  *C02F 101/16* (2006.01)

(52) U.S. Cl.
  CPC .. *C02F 2101/105* (2013.01); *C02F 2101/163* (2013.01); *C02F 2209/42* (2013.01); *C02F 2209/44* (2013.01); *C02F 2301/046* (2013.01); *Y02W 10/15* (2015.05)

(58) Field of Classification Search
  USPC .............................. 210/195.3, 605, 620, 621
  See application file for complete search history.

(56) References Cited

U.S. PATENT DOCUMENTS

| | | | |
|---|---|---|---|
| 2010/0224136 A1* | 9/2010 | Papadoyianis | A01K 61/60 119/223 |
| 2013/0020266 A1* | 1/2013 | Timmons | A01K 63/045 210/786 |
| 2014/0360934 A1* | 12/2014 | Anker | B01F 5/0212 210/620 |
| 2016/0030889 A1* | 2/2016 | Kim | C02F 1/44 210/636 |
| 2019/0216027 A1* | 7/2019 | Sternberg | A01B 45/02 |

* cited by examiner

METHOD FOR BIOLOGICAL WASTEWATER PURIFICATION WITH PHOSPHOROUS REMOVAL

The present invention relates to a method for carrying out biological purification of communal or similar wastewater with the aid of activated sludge according to the preamble of claim 1, in which the wastewater is first introduced into an activated sludge tank that can be ventilated (referred to hereinafter as the B tank) and then, in alternation, into one of a number of sedimentation and recirculation tanks (referred to hereinafter as SU tanks) continuously connected hydraulically to the B tank and in which a number of operating cycles are carried out over the course of a day, including a sludge return phase, a recirculation phase, a pre-sedimentation phase and a draw-off phase (referred to hereinafter as the S phase, U phase, V phase, and A phase respectively), wherein consecutively, in the S phase, the thickened sludge is returned in succession from the SU tanks into the B tank, in the U phase the activated sludge is again mixed with the water, in the V phase the activated sludge is sedimented, and in the A phase treated water is drawn off, wherein in the SU tanks the cycles are phase-shifted in relation to one another, the A phases border one another, a flow passes through the SU tanks merely in the A phases, an approximately constant water level is provided and therefore a wastewater treatment system discharge corresponding to the wastewater treatment system supply develops ("continuous flow" principle). Moreover, the present invention relates devices for carrying out this method.

A method for biological purification of wastewater with the aid of activated sludge, in which the wastewater is first introduced into an activated sludge tank that can be ventilated and then into a sedimentation tank, in which activated sludge and treated water are separated and, after the separation process, activated sludge is fed back into the activated sludge tank and treated water is drawn off, is known from European patent EP 0 851 844. A number of operating cycles are carried out in the sedimentation tank over the course of a day and comprise a stirring phase U, a pre-sedimentation phase V and a draw-off phase A, wherein, in the stirring phase, the activated sludge is again mixed with the water, in the pre-sedimentation phase the activated sludge is sedimented, and in the draw-off phase treated water is drawn off. In accordance with the method according to this document, the purification process takes place in a biological twin-tank system that is to say in the activated sludge tank and in the sedimentation tank, with continuous inflow and intermittent outflow. During the period of no outflow, the water level increases as a result of the inflow (filling principle). The patent claim of this method consists in the fact that sedimented activated sludge is returned to the activated sludge tank of the "twin-tank system with filling operation" after the pre-sedimentation phase and before the stirring phase. In the stirring phase, the contents of the B tank (activated sludge tank) are mixed with the contents of the SU tank (sedimentation tank) until a largely constant dry substance concentration is obtained. Both tanks border one another and are continuously interconnected hydraulically in the base region.

A similar method is known from international patent PCT/AT00/00322, in which sedimented, thickened activated sludge is returned from the SU tanks into the B tank after the V phases, but before the U phases. The B tank is continuously connected hydraulically to two SU tanks by one or more openings in the central region of the tank (see FIG. 1), and the cycle times are selected to be approximately 140 minutes (S phase approximately 5 min; U phase approximately 5 min; V phase approximately 60 min; A phase approximately 70 min, A=(S+U+V)). In the S phase, thickened sludge is conveyed from the base of the SU tanks into the upper region (close to the surface) of the B tank, and the contents of the B tank thus displaced are returned via the openings in the central region of the tank. In the U phase, the contents of the SU tank are swirled and homogenized, without generation of a circulating flow via the B tank. In the A phase, there is a flow from the B tank into the SU tank, likewise through the openings in the central region. The stirring in the SU tanks (U phase) is achieved by blowing in air.

The object of the present invention is to improve and/or complement the method described in the introduction for biological wastewater purification in such a way that an application for wastewater treatment plants is also made possible.

This object is achieved by a method having the features of claim 1 and by devices for carrying out this method. Advantageous developments of the invention are disclosed in the dependent claims.

The method according to the invention is characterized by the elimination of phosphor by using of a tank for the biological Phosphor elimination (bio-P), referred to hereinafter as P tank. The P tank is hydraulically connected with the B tank via one or more openings. The crude waste water is first introduced into the P tank and subsequently into the B tank, wherein consecutively, in the S phase at least part of the thickened activated sludge is introduced from the SU tank into the P tank, in the U phase the activated sludge is again mixed with the water, in the V phase the activated sludge is sedimented, and in the A phase treated water is drawn off, wherein in the SU tanks the cycles are phase-shifted in relation to one another, the A phases border one another, a flow passes through the SU tanks merely in the A phases, an approximately constant water level is provided and therefore a wastewater treatment system discharge corresponding to the wastewater treatment system supply develops ("continuous flow" principle), and, wherein the volume of the P tank is mixed permanently or intermittently.

In order to save space and costs, the bio-P is applied in the special waste water treatment plants described in claim 1 of the present invention. The additional constructional costs for the implementation of the P tank, which include e.g. a wall between the P tank and the B tank, a pipe for the transport of the thickened sludge from the SU tank into the P tank, and a mixing system for mixing the volume of the P tank, are moderate compared to the costs for a phosphor precipitation.

The P tank produces in the same way an equalization of the concentrations of the waste water in the B tank and increases the dry concentration of the activated sludge in the B tank. This increase results in a necessary complete volume of the treatment system, which volume will be nearly equally large with or without the P tank.

In the S phase the thickened activated sludge flows from the SU tank into the P tank preferably by means of a pipe or a conduit connecting the SU tank with the P tank.

In one arrangement of the tanks, when the SU tanks are arranged side by side on one side of the B tank, the P tank is arranged on a side of the B tank opposite of the side where the SU tanks are arranged (see FIG. 2).

In another arrangement of the tanks, when the SU tanks are arranged on opposite sides of the B tank, the P tank is arranged in the middle of the B tank (see FIG. 4). This arrangement is useful with regard to wastewater purification by large waste water treatment plants with many modules. In order to mix the rude waste water in the P tank efficiently with the sludge, the P tank is preferably constructed in the form of a circulation tank. Circulation tanks that may be used in the present invention are well known to those skilled in the art and typically comprise a horizontal partition wall, around which the waste water is kept in a horizontal circular flow. In specific embodiments, the content of the P tank is mixed by producing a horizontal flow in longitudinal direction at the water level and a horizontal flow in opposite direction at the bottom of the P tank. To ensure that all modules of the waste water treatment plant get the same quantity of the mixture of waste water and sludge, the water level of the P tank is lifted up 10-20 cm over the level of the B tank. The water velocity in the openings connecting the P tank with the B tank amounts to approximately 1.4-2.0 m/s.

In order to obtain a cascade effect, more than one P tank, e.g. two or more P tanks, can be provided in the method according to the invention.

Preferably, the width of the P tank is approximately L/6, with L being the width of the SU tanks.

It is particularly cost-effective and energy-saving if the thickened sludge (S phase) is returned using air lift pumps and if compressed air is likewise used to recirculate the contents of the SU tanks (U phase). The compressed air provided for ventilation of the B tanks is also suffice for this.

Different devices can be used for the draw-off of the treated wastewater. It is also noted that a large part of the nitrate concentration is found in the SU tanks (endogenous dentrification) with this method. The excess sludge will be preferably received by the P tank. The excess sludge is drawn off from the base of the P tank before a new mixing of waste water and sludge in the P tank begins. The activated sludge is then thickened to the greatest possible extent.

In the method according to the invention, either part of the thickened activated sludge or all of the thickened activated sludge is transferred from the SU tank into the P tank. In addition thereto, less thickened activated sludge may preferably also be transferred from the SU tank into the B tank. A person skilled in the art will know which amount of thickened activated sludge (and, if necessary, less thickened activated sludge) is to be transferred from the SU tank into the P tank (and B tank).

Excellent purification with a very low energy requirement and low costs is achieved as a result of the balanced water level in the B tank and in the SU tanks, as a result of the use of compressed air for operation of the S and U phases (simultaneous entry of oxygen) and as a result of the extensive (endogenous) dentrification.

The present invention also relates to waste water purification devices for carrying out the above-described method.

Accordingly, the invention relates to a wastewater purification device comprising an activated sludge tank that can be ventilated (hereinafter referred to as the B tank), a number of sedimentation and recirculation tanks (hereinafter referred to as SU tanks) continuously connected hydraulically to the B tank and in which a number of operating cycles are carried out over the course of a day, including a sludge return phase, a recirculation phase, a pre-sedimentation phase and a draw-off phase (hereinafter referred to as the S phase, U phase, V phase, and A phase respectively), and a tank for biological phosphor elimination (hereinafter referred to as P tank), wherein the P tank is hydraulically connected with the B tank via one or more openings. In one arrangement, the SU tanks are arranged side by side on one side of the B tank and the P tank is arranged on a side of the B tank opposite of the side where the SU tanks are arranged (see FIG. 2 and FIG. 3). In another, alternative, arrangement, the SU tanks are arranged on opposite sides of the B tank and the P tank is arranged in the middle of the B tank (see FIG. 4). In an alternative arrangement, the P tanks are arranged between the SU tanks and the B tank (see FIG. 5 and FIG. 6). The wastewater purification devices of the invention are characterized in that the SU tanks and the P tank are connected by a pipe for allowing the activated sludge to flow from the SU tanks into the P tank. In order to obtain a cascade effect, the wastewater purification devices preferably contain more than one P tank, e.g. two or more P tanks. Preferably, the width of the P tank is approximately L/6, with L being the width of the SU tanks. In the P tank, means are provided to permanently or intermittently mix the waste water with the thickened activated sludge that flows from the SU tanks into the P tank. Preferably, the P tank is constructed in the form of a circulation tank.

Further details of the present invention will emerge from the following drawings, which illustrate exemplary, non-limiting embodiments of the invention. In the drawings, an operating cycle (Fig.) and wastewater treatment systems representing the S phase (FIGS. 2-6) are shown:

Figure 1:
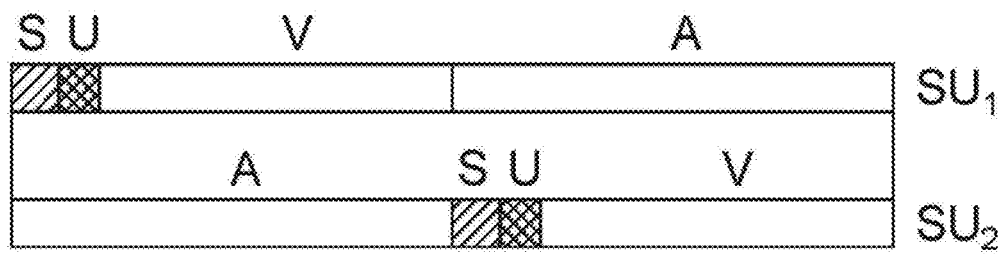
FIG. 1 shows an operating cycle for the two SU tanks shown in the exemplary embodiments.

FIG. 1 shows the operating cycle for the two SU tanks $SU_1$ and $SU_2$ shown in the exemplary embodiments, wherein time extends in horizontal direction from left to right. The course and function of the individual phases, i.e. S phase, U phase, V phase and A phase, have already been discussed above in greater detail.

Figure 2:
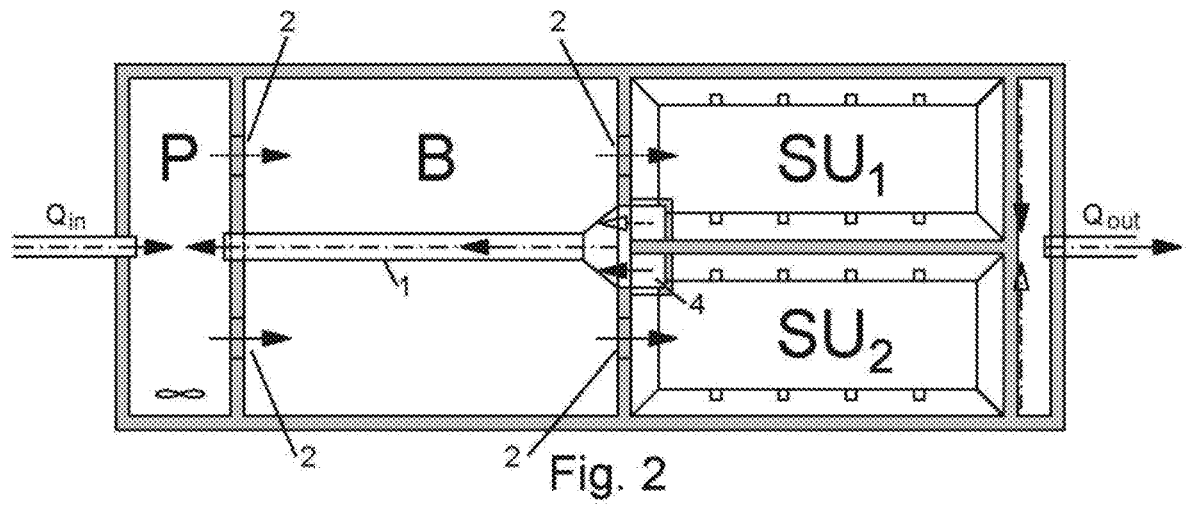
FIG. 2 shows a schematic illustration of a wastewater treatment system, in which the SU tanks are arranged side by side on one side of the B tank and the P tank is arranged on a side of the B tank opposite of the side where the SU tanks are arranged.
Figure 3:
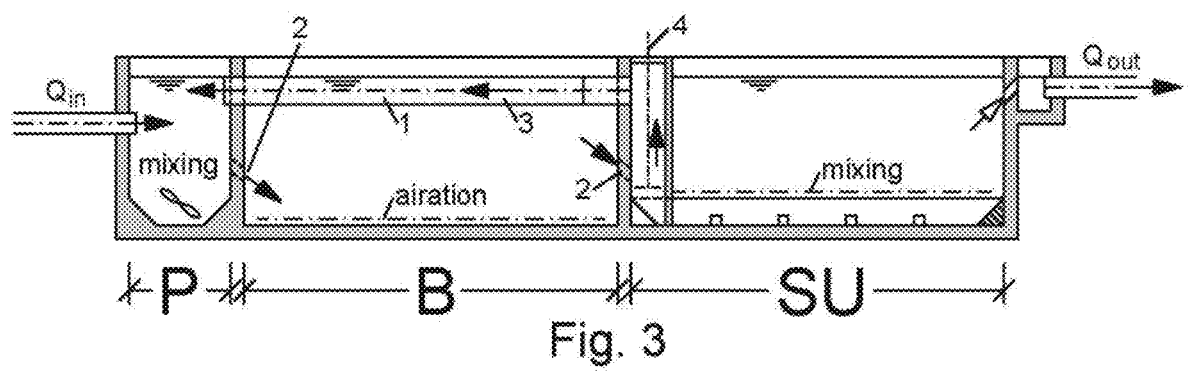
FIG. 3 shows a vertical sectional view of the wastewater treatment system of FIG. 2.

FIG. 2 shows a schematic illustration of a wastewater treatment system, in which the two SU tanks $SU_1$ and $SU_2$ are arranged side by side on one side of the B tank and the P tank is arranged on a side of the B tank opposite of the side where the SU tanks $SU_1$ and $SU_2$ are arranged. FIG. 3 shows a vertical sectional view of the system of FIG. 2 (along a line which, in FIG. 2, extends horizontally through the system of FIG. 2). $Q_{in}$ signifies the flow of the wastewater introduced into the P tank, wherein $Q_{out}$ is the flow of the treated water flowing off the water treatment system. The thickened activated and aerated sludge 3 flows from the SU tanks $SU_1$ and $SU_2$ into the P tank via a pipe 1. In order to mix the waste water in the P tank efficiently with the thickened activated sludge 3, the volume of the P tank is mixed permanently or intermittently. The mixture of waste water and sludge is then transferred into the B tank and further to the SU tanks $SU_1$ and $SU_2$ via one or more openings 2 connecting the P tank with the B tank and the B tank with the SU tanks $SU_1$ and $SU_2$, respectively. 5 signifies the airlift operation unit for operation of the S phase. The width of the P tank is approximately L/6, with L being the width of the SU tanks $SU_1$ and $SU_2$.

Figure 4:
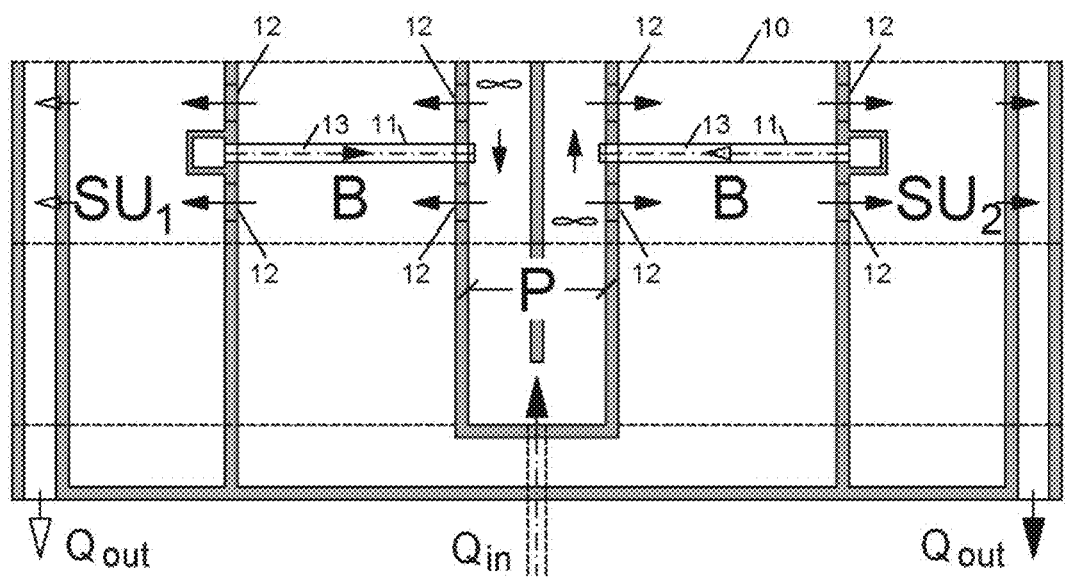
FIG. 4 shows a schematic view of a module of a large waste water treatment plant, in which the SU tanks are arranged on opposite sides of the B tank and the P tank is arranged in the middle of the B tank.

FIG. 4 shows a schematic view of a module 10 of a large waste water treatment plant, in which the SU tanks $SU_1$ and $SU_2$ are arranged on opposite sides of the B tank and the P tank is arranged in the middle of the B tank. $Q_{in}$ signifies the flow of the wastewater introduced into the P tank, wherein $Q_{out}$ is the flow of the treated water flowing off the water treatment system. The thickened activated and aerated sludge 13 flows from the SU tanks $SU_1$ and $SU_2$ into the P tank via pipes 11. In order to mix the waste water in the P tank efficiently with the thickened activated sludge 13, the volume of the P tank is mixed permanently or intermittently. The P tank is constructed in the form of a circulation tank ensuring efficient mixing of waste water and sludge. The mixture of waste water and sludge is then transferred into the B tank and further to the SU tanks $SU_1$ and $SU_2$ via one or more openings 12 connecting the P tank with the B tank and the B tank with the SU tanks $SU_1$ and $SU_2$, respectively.

Figure 5:
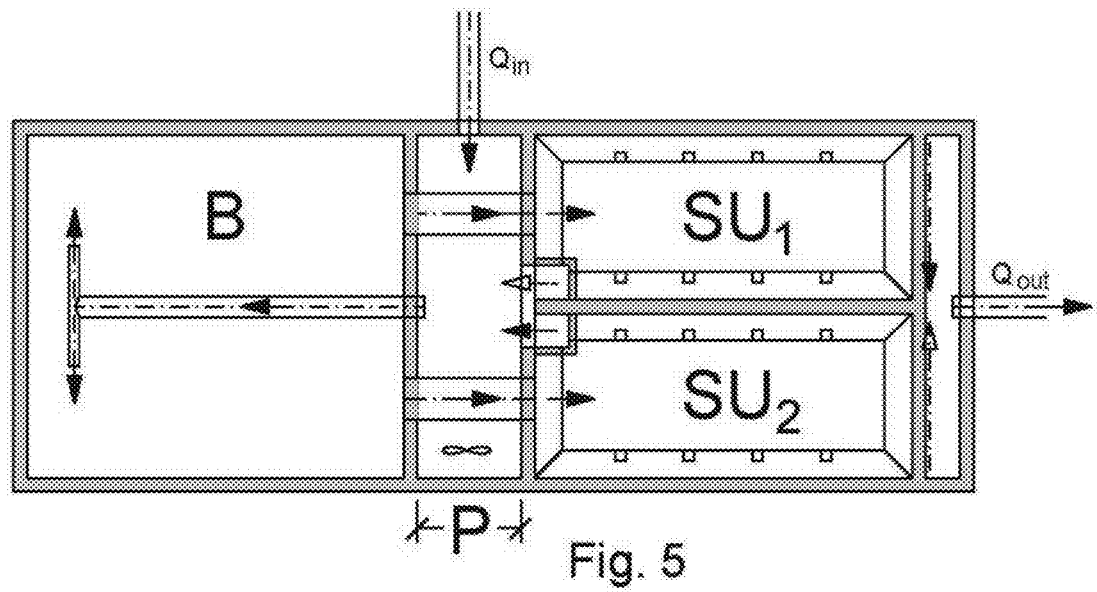
FIG. 5 shows a schematic illustration of a wastewater treatment system, in which the SU tanks are arranged side by side on one side of the B tank and the P tank is arranged between the SU tanks and the B tank.
Figure 6:
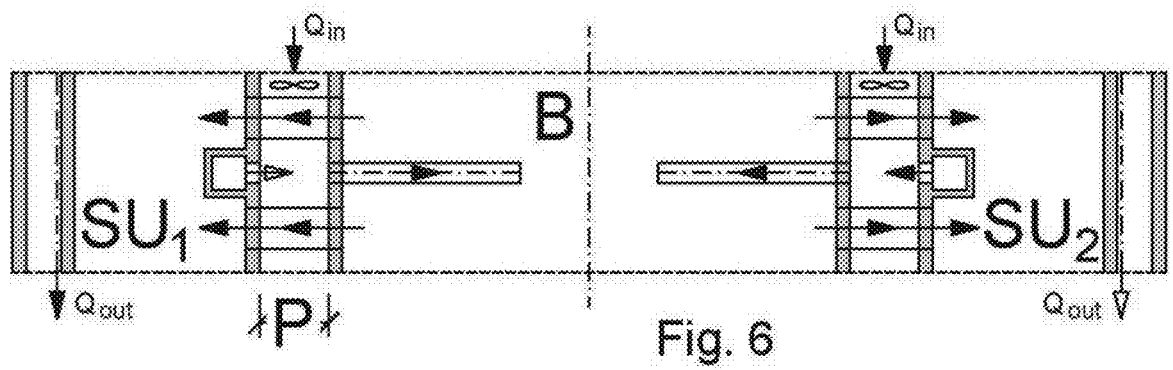
FIG. 6 shows a schematic view of a module of a large waste water treatment plant, in which the SU tanks are arranged on opposite sides of the B tank and the P tank is arranged between the SU tanks and the B tank.

FIG. 5 and FIG. 6 show alternative arrangements of the arrangements of FIG. 2 and FIG. 4, wherein the P tank is situated between the SU tanks and the B tank.

The invention claimed is:

1. A method for carrying out biological purification of wastewater with the aid of activated sludge, the method comprising:
   providing an activated sludge tank that can be ventilated (the B tank);
   providing at least two sedimentation and recirculation tanks (the SU tanks), which are continuously connected hydraulically to the B tank and in which a number of operating cycles are carried out over the course of a day, the operating cycles including a sludge return phase (the S phase), a recirculation phase (the U phase), a pre-sedimentation phase (the V phase), and a draw-off phase (the A phase); and
   providing a tank for biological phosphorus elimination (the P tank), wherein the P tank is hydraulically connected with the B tank via one or more openings,
   wherein the wastewater is first introduced into the P tank, in which the volume of the P tank is mixed permanently or intermittently with activated sludge and phosphorous is eliminated from the wastewater, and then the wastewater is subsequently transferred from the P tank into the B tank, and then from the B tank, in alternation, into the SU tanks,
   wherein consecutively, in the S phase at least part of a thickened activated sludge is introduced from the SU tank into the P tank, in the U phase the activated sludge is again mixed with the wastewater, in the V phase the activated sludge is sedimented, and in the A phase treated water is drawn off,
   wherein in the SU tanks the cycles are phase-shifted in relation to one another, the A phases are temporally adjacent to one another, a flow passes through the SU tanks only in the A phases, an approximately constant water level is provided, and therefore a wastewater treatment system discharge corresponding to the wastewater treatment system supply develops ("continuous flow" principle),
   wherein, when the SU tanks are arranged side by side on one side of the B tank, the P tank is arranged in one case on a side of the B tank opposite of the side where the SU tanks are arranged and in a second case between the SU tanks and the B tank, and, when the SU tanks are arranged on opposite sides of the B tank, the P tank is arranged in one case in the middle of the B tank and in a second case between the SU tanks and the B tank, and
   wherein the SU tanks are not in an aerobic condition.

2. The method according to claim 1, wherein excess sludge is received by the P tank.

3. The method according to claim 1, wherein the activated sludge flows from the SU tanks into the P tank by means of a pipe connecting the SU tanks with the P tank.

4. The method according to claim 1, wherein the width of the P tank is approximately L/6, with L being the width of the SU tanks.

5. The method according to claim 1, wherein the wastewater and the thickened activated sludge in the P tank are mixed by producing a flow in a longitudinal direction at the water level and a flow in an opposite direction at the bottom of the P tank.

* * * * *